May 8, 1951        R. G. MILLER        2,552,053
FILLER CAP
Filed Oct. 24, 1949
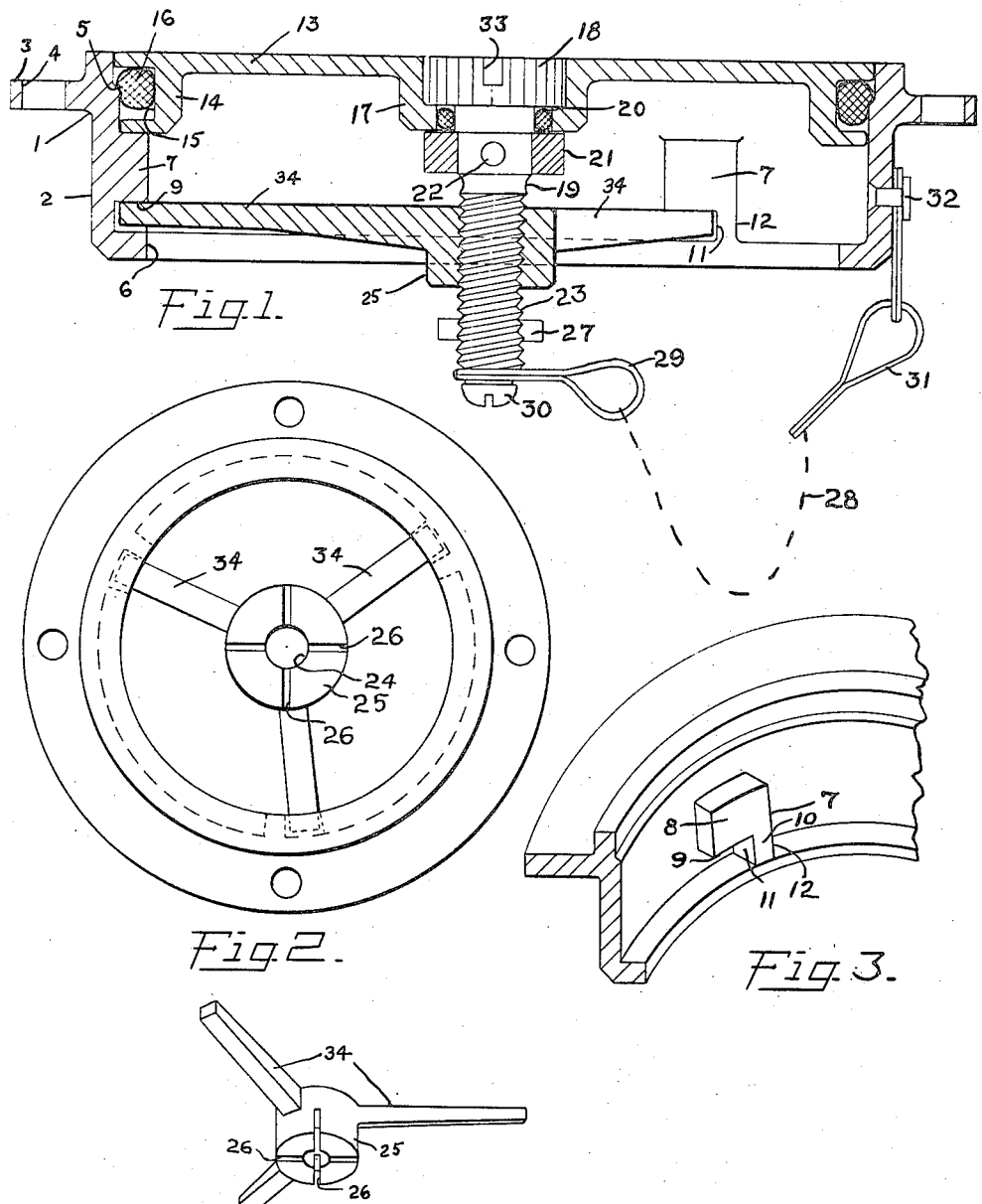
INVENTOR.
Roy G. Miller
BY Pierce, Scheffler & Parker
his Atty's Patented May 8, 1951

2,552,053

UNITED STATES PATENT OFFICE 2,552,053

FILLER CAP

Roy G. Miller, Bayside, N. Y., assignor to East Coast Aeronautics, Inc., Mount Vernon, N. Y., a corporation of New York Application October 24, 1949, Serial No. 123,239

4 Claims. (Cl. 220—25)

This invention relates to a filler cap or closure assembly designed and adapted for use on the fuel tanks of aircraft but capable of a variety of other uses.

An object of the invention is to provide a closure assembly which is of relatively light weight, which may be installed quickly and at low cost, which avoids the use of a door, scupper and scupper drain, which provides a positive or rigid as distinguished from a spring held seal, which is strong and capable of withstanding a considerable amount of pressure both inwardly and outwardly, which presents a smooth surface flush with the aerodynamic surface of the aircraft, which can be readily and quickly opened and closed, which avoids wear of the holding surfaces in the act of being opened and closed, which is positively locked in closed position against accidental removal, which may be opened and closed without special tools, which requires only a relatively small opening in the fuel tank and thus minimizes the vulnerability of self-sealing fuel tanks, which does not materially reduce the fuel capacity of the fuel tank and which avoids the presence of a cavity for the accumulation of water or ice.

The closure assembly consists essentially of an adapter comprising a cylindrical portion adapted to extend through an opening in the wall of the tank and a surrounding flange which is adapted to be secured to the wall of the tank around the opening therein, and the cap assembly comprising the cap member provided with a sealing gasket adapted to engage the inner surface of the cylindrical portion of the adapter, a spider which engages projections on the inner wall of the adapter for securing the cap in closed position and an inter-connecting and tightening screw.

The accompanying drawings show an embodiment of the invention which will serve to illustrate it.

In the drawings:

Fig. 1 is a central vertical section of the closure assembly with parts appearing in elevation;

Fig. 2 is a bottom plan view of the spider associated with the adapter in closed position, the screw and cap being omitted;

Fig. 3 is a perspective view of a portion of the adapter; and

Fig. 4 is a perspective view of the spider.

Referring to the drawings, 1 is the adapter having the cylindrical wall 2 and the disc-shaped flange 3 extending outwardly therefrom at a short distance from the upper end thereof. The distance between the upper surface of the flange 3 and the top of the wall 2 is designed to be equal to the thickness of the wall to which the closure assembly is to be attached, e. g. the skin of the aircraft and a spacer, so as to bring the surface of the cap flush with the surface of the surrounding wall. The flange 3 may be secured to the wall in any suitable way as by welding or riveting or by means of screws or bolts. Screw holes 4 are shown by way of illustration. The inner surface of the wall 2 is provided with a bead or shoulder 5 adapted to be engaged by the gasket of the cap. It is further provided, preferably adjacent to or at the bottom edge thereof with the inwardly projecting flange 6 adapted to support the spider. The inner surface of the wall 2 is further provided with two or more (generally three) integral inwardly extending lugs 7 consisting of the upper portions 8 providing the flange surfaces 9, parallel to the flange 6 and adapted to be engaged by the spider legs to prevent upward movement thereof and the lower portions 10 providing the stop surfaces 11 and 12 adapted to stop the rotary movement of the spider legs. The flange surfaces 9 and the upper surface of the flange 6 are spaced apart sufficiently to permit free movement of the spider legs between them.

The cap assembly consists of the cap disc 13 having the depending flange 14 providing the peripheral gland 15 in which the O-ring gasket 16 is seated. As will be seen in Fig. 1, the disc 13 is of such size as to fit snugly within the upper end of the cylindrical wall 2 and flush with the upper edge thereof when the lower surface of the flange 14 rests on the lugs 7 and the O-ring gasket engages the shoulder or bead 5. The disc 13 has a central opening surrounded by the depending flange 17 which provides a socket for the head 18 of the screw 19. The portion of the screw adjacent the head is smooth and where it extends through the opening at the bottom of the flange 17 is surrounded by the packing or O-ring gasket 20. The screw is held against axial movement with respect to the disc 13 and flange 17 by the collar 21 which is secured to the screw 19 by the drive pin 22. The threaded portion 23 of the screw 19 has a double thread of large pitch to give quick action. It extends through a threaded opening 24 in the hub 25 of the spider, the base of the hub being provided with the slots 26 and being sprung to provide permanent friction between the screw and the spider hub sufficient to insure rotation of the spider with the screw when the spider legs are free of the flanges 6 and 9. The spider is retained on the screw 19 by the drive pin 27 and the cap assembly is secured to the adapter 1 to prevent loss, by the chain 28 secured to the screw 19 by the link 29 and screw 30 and to the adapter 1 by the link 31 and rivet 32.

In operation, assuming that the closure is in the position shown in Fig. 1, the screw 19 is turned counterclockwise by means of a coin, screw driver or other suitable tool inserted in the groove 33 in the head 18 first releasing the tension which draws the disc downwardly against the resilience of the O-ring 16 and that of the spider legs 34. When this tension is relieved the spider legs become sufficiently free of frictional contact with the surfaces 9 to rotate with the screw out of alinement with the surfaces 9 until contact with stops 12 prevents further rotation of the spider. Further turning of the screw causes the spider legs to engage the flange 6 and lifts the cap disc 13 clear of the adapter so that it can be grasped by the fingers and the cap assembly lifted out of the adapter. For replacing the cap assembly it is reinserted into the adapter so that the spider legs pass through the spaces between the lugs 7 and rest on the flange 6. The screw is then rotated, clockwise, first bringing the disc 13 and the spider closer together until the O-ring 16 rests on the bead 5 and the spider legs 34 are raised sufficiently with respect to the flange 6 to be free to rotate. Further turning of the screw rotates the spider until the legs thereof engage the stops 11 and still further rotation compresses the O-ring 16 downwardly firmly against the bead 5 and draws the spider legs 34 upwardly against the surfaces 9.

Many obvious variations of the specific structure illustrated fall within the scope of my invention which is defined in the appended claims. The chain 28 and its associated parts 29, 30, 31 and 32 may of course be omitted, the size and shape of the lugs 7 which provide the flange surfaces 9 and the stops 11 and 12 may be varied, the shape and number of the spider legs may be varied, etc. However, it is considered to be practically essential to the optimum utility of the closure that when the cap assembly is in place as illustrated in Fig. 1 the O-ring 16 shall be compressed and deformed so as to exert resilient pressure against the shoulder 5 and that the spider legs 34 shall be sprung sufficiently to maintain substantial pressure thereof against the surfaces 9 and further that there shall be sufficient friction between the screw 19 and the opening 24 and the O-ring to prevent the screw from turning under the effect of vibration.

I claim:

1. A closure assembly comprising an adapter member and a cap assembly, the latter comprising a cap member, a spider member and a connecting screw, said adapter member comprising a cylindrical portion having an inwardly extending supporting surface adjacent one end thereof adapted to receive and support the cap member and other inwardly extending surfaces spaced apart longitudinally of said cylindrical portion from said supporting surface adapted to receive the spider member and to releasably secure it against longitudinal movement within said cylindrical portion, said connecting screw having an unthreaded portion adjacent the head thereof extending through a central opening in the cap member and being freely turnable therein and a threaded portion extending through a threaded opening in the spider member and said cap member having a peripheral groove containing a resilient O-ring gasket adapted to engage the inner surface of said adapter.

2. A closure assembly as defined in claim 1 in which the inner wall of the adapter is provided with an inwardly extending shoulder adapted to be engaged by said O-ring.

3. A closure assembly as defined in claim 1 in which the unthreaded portion of the screw is smaller than the opening in the cap member and the intervening space is closed by an O-ring gasket.

4. A closure assembly as defined in claim 1 in which the inner wall of the adapter is provided with an inwardly extending shoulder adapted to be engaged by said O-ring gasket, said unthreaded portion of the screw is smaller than the opening in the cap member and the intervening space is closed by an O-ring gasket, and said spider has a split hub adapted to maintain a constant predetermined frictional engagement between the screw and the spider.

ROY G. MILLER.

REFERENCES CITED

The following references are of record in the file of this patent:

UNITED STATES PATENTS

| Number | Name | Date |
|---|---|---|
| 921,069 | Blake | May 11, 1909 |
| 1,174,278 | Prier | Mar. 7, 1916 |
| 1,324,981 | Roesch | Dec. 16, 1919 |
| 1,471,079 | Wacker | Oct. 16, 1923 |
| 1,999,704 | Rigney | Apr. 30, 1935 |
| 2,183,282 | Rike | Dec. 12, 1939 |
| 2,333,890 | Russell | Nov. 9, 1943 |
| 2,465,727 | Jensen | Mar. 29, 1949 |

FOREIGN PATENTS

| Number | Country | Date |
|---|---|---|
| 3,143 | Great Britain | 1891 |